United States Patent
Meyer

(10) Patent No.: US 7,628,202 B2
(45) Date of Patent: Dec. 8, 2009

(54) ENHANCED OIL RECOVERY USING MULTIPLE SONIC SOURCES

(75) Inventor: Robert Jay Meyer, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/769,933

(22) Filed: Jun. 28, 2007

(65) Prior Publication Data

US 2009/0003131 A1    Jan. 1, 2009

(51) Int. Cl.
  *E21B 43/00*    (2006.01)
  *E21B 28/00*    (2006.01)
(52) U.S. Cl. .................... 166/249; 166/177.2
(58) Field of Classification Search .......... 166/268, 166/177.1, 177.2, 249
See application file for complete search history.

(56) References Cited

U.S. PATENT DOCUMENTS

| | | | | |
|---|---|---|---|---|
| 3,189,536 A | * | 6/1965 | Bodine | 166/249 |
| 3,578,081 A | * | 5/1971 | Bodine | 166/249 |
| 3,754,598 A | * | 8/1973 | Holloway, Jr. | 166/249 |
| 4,280,558 A | * | 7/1981 | Bodine | 166/245 |
| 4,648,449 A | * | 3/1987 | Harrison | 166/249 |
| 5,184,678 A | * | 2/1993 | Pechkov et al. | 166/249 |
| 5,282,508 A | * | 2/1994 | Ellingsen et al. | 166/249 |
| 5,396,955 A | * | 3/1995 | Howlett | 166/249 |
| 5,418,335 A | * | 5/1995 | Winbow | 181/106 |
| 5,460,223 A | * | 10/1995 | Economides | 166/249 |
| 5,826,653 A | * | 10/1998 | Rynne et al. | 166/245 |
| 6,390,191 B1 | * | 5/2002 | Melson et al. | 166/177.1 |
| 6,405,796 B1 | | 6/2002 | Meyer et al. | |
| 6,427,774 B2 | * | 8/2002 | Thomas et al. | 166/248 |
| 6,496,448 B1 | * | 12/2002 | Kompanek | 367/157 |
| 6,499,536 B1 | * | 12/2002 | Ellingsen | 166/248 |
| 7,059,413 B2 | * | 6/2006 | Abramov et al. | 166/302 |
| 7,350,567 B2 | * | 4/2008 | Stolarczyk et al. | 166/249 |
| 2002/0070017 A1 | * | 6/2002 | Soliman et al. | 166/249 |
| 2002/0104652 A1 | * | 8/2002 | Cole et al. | 166/249 |
| 2002/0195246 A1 | * | 12/2002 | Davidson | 166/249 |
| 2003/0042018 A1 | * | 3/2003 | Huh et al. | 166/249 |
| 2003/0164038 A1 | | 9/2003 | Han et al. | |
| 2004/0112594 A1 | * | 6/2004 | Aronstam et al. | 166/249 |
| 2005/0098314 A1 | * | 5/2005 | Pope et al. | 166/249 |
| 2005/0189108 A1 | * | 9/2005 | Davidson | 166/249 |
| 2005/0201203 A1 | | 9/2005 | Goloshubin et al. | |
| 2006/0036376 A1 | | 2/2006 | Gudmundsson et al. | |
| 2006/0096752 A1 | * | 5/2006 | Arnoldo Barrientos et al. | 166/249 |
| 2006/0108111 A1 | * | 5/2006 | Kas'yanov | 166/249 |

(Continued)

*Primary Examiner*—David J Bagnell
*Assistant Examiner*—Cathleen R Hutchins
(74) *Attorney, Agent, or Firm*—Gibb I.P. Law Firm, LLC

(57) ABSTRACT

A method and apparatus control a plurality of sonic sources to generate sound waves within at least one opening of an item. The "item" can comprise almost anything that has a percolation path (a path where solid particles are to be separated from liquid particles), such as the ground, aggregates, porous structures, porous materials, and a semi-solid structure. By controlling the sonic sources, the method transmits the sound waves to the percolation path. Further, the method regulates the amplitude and frequency of the sound waves such that the liquid particles oscillate out of phase with the solid particles. The method also regulates the phases of the sound waves generated by the different sonic sources so as to control locations within the percolation path where the liquid particles oscillate out of phase with the solid particles.

20 Claims, 11 Drawing Sheets

U.S. PATENT DOCUMENTS

2006/0289155 A1* 12/2006 Van Kuijk et al. ........... 166/249
2007/0069732 A1 3/2007 Mercer
2008/0073079 A1* 3/2008 Tranquilla et al. ....... 166/270.1

* cited by examiner

ENHANCED OIL RECOVERY USING MULTIPLE SONIC SOURCES

BACKGROUND AND SUMMARY

Embodiments herein generally relate to structures and methods that help remove oil from percolation paths and more particularly to a structure and method that applies interference of sound waves from one or more sources to control the locations where solids separate from liquids.

It has been estimated that only half of the oil present in a natural reservoir is produced by primary, secondary, and tertiary oil recovery techniques combined. This is due to the formation of percolation paths in which injected gases or fluids break through to adjoining (extraction) boreholes. Once this happens no new oil is forced out because all injected fluids follow the established percolation paths to the extraction boreholes.

In one embodiment herein a method comprises controlling a plurality of sonic sources to generate sound waves within at least one borehole opening in the ground. A percolation path is one that comprises a combination of liquid particles (oil) and solid particles (rocks, dirt). If one is to view rock as a porous solid, consisting of the solid rock frame containing pores, these pores typically contain fluid (water, brine, oil, gas). In some regions the pores may connect and form a continuous path through which the fluids can move if/when subjected to a pressure gradient. When fluids are injected into one borehole other fluids can be forced out of some neighboring extraction borehole. However, they don't have to be, especially in reservoirs containing gas. At any rate, the regions in which fluids are moving are called percolation paths. These moving fluids might be pore fluids originally in the reservoir (oil, gas, brine), or they might be injected fluids (water, steam, detergents, borehole mud, etc.)

The sound goes to many areas of the item (e.g., the oil reservoir). This disclosure is interested in how the second sound wave interacts with pore fluids along the periphery of the active percolation paths. In particular, the second sound should encourage migration of in-situ pore fluids from the periphery into active percolation paths.

By controlling the sonic sources, the method transmits the sound waves to the percolation path. Further, the method regulates the amplitude and frequency of the sound waves such that the liquid particles oscillate out of phase with the solid particles. The method also regulates the phases of the sound waves generated by the different sonic sources so as to control locations within the percolation path where the liquid particles oscillate out of phase with the solid particles.

Further, different embodiments herein can position the sonic sources within the borehole openings so as to form a regular pattern of the sonic sources within the ground. Embodiments herein can also maintain the sonic sources at fixed positions with the ground.

The regulating of the phases of the sound waves causes the sound waves to combine is specific locations of the percolation path and causes the sound waves to cancel each other out in other locations of the percolation path. Thus, embodiments herein can regulate the phases of the sound waves and the amplitude and frequency of the sound waves generated by different ones of the sonic sources so as to control locations within the percolation path where the liquid particles oscillate out of phase with the solid particles and to control amounts by which the liquid particles oscillate out of phase with the solid particles.

An apparatus embodiment herein includes a controller connected to a plurality of sonic sources. Each of the sonic sources comprises an external cover and at least one sonic acoustic acoustic generator. The external cover can be made of a sealed, liquid-tight, and gas-tight material that is adapted to be positioned within an opening of an item, or can be formed of any appropriate material that will be durable in the environment in which the sonic source will be located. The opening (e.g., borehole in the ground) can be fully or partially lined with a casing, or can be unlined. The item (e.g., ground) comprises at least one percolation path having a combination of liquid particles and solid particles. The sonic acoustic acoustic generator can be positioned within the borehole opening and is adapted to generate and transmit sound waves into the percolation paths.

The controller regulates the amplitude and frequency of the sound waves such that the liquid particles oscillate out of phase with the solid particles. Further, the controller is adapted to regulate the phases and amplitudes of the sound waves generated by the different sonic sources so as to control locations within the percolation path where the liquid particles oscillate out of phase with the solid particles and to control amounts by which the liquid particles oscillate out of phase with the solid particles.

In another embodiment, each of the sonic sources can include a plurality of sonic (acoustic) generators positioned within the borehole opening. The structure includes at least one support structure (cable, wire, pipe, frame, etc.) connected to the external cover. The support structure is adapted to maintain at least one of the sonic sources at a fixed position with the borehole opening.

Primary oil recovery uses the natural pressure of the oil reservoir to push oil to the surface. In secondary oil recovery gases or water is forced into the reservoir to force oil out through adjacent boreholes. In tertiary recovery other gases (such as carbon dioxide), or heat (steam or hot water) are used to stimulate oil and gas flow to produce remaining fluids that were not extracted during primary or secondary recovery phases. The amount of fluid forced into one well equals roughly the amount of fluid withdrawn from another well, hopefully oil. This is true in regions where the pore fluid is incompressible, e.g., oil, brine. It is not always true in regions where the pore fluid is compressible, e.g., gas. Typically, oil recovery techniques cease to be useful when a percolation path for the injected fluid or gas breaks through from the insertion well to the withdrawal well. Even with enhanced oil recovery techniques, only about half of the oil in a natural oil reservoir is recovered in the primary, secondary and tertiary oil recovery, leaving the rest unrecoverable. Thus, there is considerable oil value left in the ground in mature oil fields. Any new technique that will increase recovery of oil from these previously recovered reservoirs is valuable.

In June 2002 a patent (U.S. Pat. No. 6,405,796) was issued to Robert Meyer and Christine Tarnawskyj for a method of enhancing oil recovery by using ultrasonics. This patent uses ultrasonics at a specific frequency (determined by the rock permeability and fluid density and viscosity) to excite a second sound mode in which the porous rock oscillates out of phase with the fluids in the pores of the permeable rock. Thus, the rock frame moves one direction and the pore fluid moves the other way. This process is referred to as "second sound" and can be used to move oil contained in pores adjacent to an operating percolation path into the flow path. Thus, oil that might otherwise be unrecoverable is recovered. The basic physics of second sound) is well established in the scientific literature (cited in U.S. Pat. No. 6,405,796).

BRIEF DESCRIPTION OF THE DRAWINGS

Various exemplary embodiments of the systems and methods are described in detail below, with reference to the attached drawing figures, in which.

DETAILED DESCRIPTION

Figure 1:
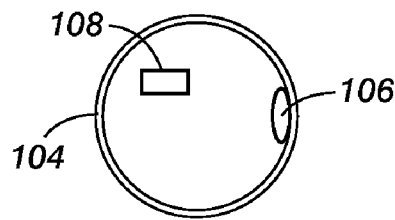
FIG. 1 is a schematic top-view diagram illustrating a sonic source having an external cover.

While the present method and structure will be described in connection with embodiments thereof, it will be understood that this disclosure is not limited to the disclosed embodiments. On the contrary, this disclosure is intended to cover all alternatives, modifications, and equivalents as may be included within the spirit and scope, as defined by the appended claims.

U.S. Pat. No. 6,405,796 issued to Meyer, et al. (hereinafter "Meyer" which is fully incorporated herein by reference, and is commonly assigned with the present application) describes how ultrasound can be used to excite a fluid and rock into a mode known as Biot's acoustic slow wave, which is sometimes referred to as "second sound." During second sound, the pore fluid (e.g., oil in one example) and the rock oscillate out of phase. This allows fluids peripheral to percolation paths (discussed above) to migrate or be forced into the percolation path, where they can be extracted.

The present embodiments improve upon the systems and methods described in Meyer by employing one or more sonic or ultrasonic sources, all operating at the second sound frequency of the surrounding reservoir formations. The one or more sonic sources can operate out of phase with each other to create interference patterns which allow the location of the second sound within the solid to be precisely controlled and moved around.

When using multiple sonic sources, which can be either located at various depths within the same borehole, or in different boreholes in the same locale of the item reservoir, it is possible to localize the excited second sound oscillation mode in specific areas of the solid, both laterally and in depth. This is accomplished by simultaneously controlling the amplitude and phase of the ultrasound produced by each of several ultrasonic sources (or reflected waves of sound). Interference of sound waves from several sources can produce local maxima, which can be moved at will to varying locations to stimulate local separation of solid particles and liquid particles. By precisely controlling these locations where the excited second sound oscillation mode occurs, it is possible to systematically close off or establish new percolation paths for fluid motion. This allows, in one example, systematic variation of the region of a reservoir from which oil is being extracted. Thus, the active percolation paths are areas of the reservoir from which oil and gas is currently being extracted, and the embodiments herein can control the locations of the second sound to reposition or move these percolation paths into areas of the reservoir which have not yet been tapped or produced.

In one example, by varying the phase and amplitude of different sonic devices it is possible to create regions of constructive and destructive interference of second sound waves throughout the oil reservoir. Areas of constructive interference can be used to encourage flow of peripheral oil into active fluid motion percolation paths for recovery. Further, constructive interference can be used to close off percolation paths by first shutting off external pressure drive pumps, and then applying ultrasound to a region to encourage oil flow into the non-active percolation path, thereby blocking it. Subsequent reactivation of external pumps then applies pressure to a new area for active oil recovery by conventional enhanced oil recovery methods. Therefore, by combining these techniques, it is possible to systematically drain different areas of the oil reservoir of the producible reserves. Thus, with embodiments herein, the production of oil from mature reservoirs becomes not an exercise in random percolation theory as it is currently, but rather an optimization problem in (oil) traffic control, i.e., the order of which is optimized to drain various parts of the reservoir to enable maximum oil recovery.

FIG. 1 illustrates one example of a sonic source that comprises any form of outer covering 104 and a single acoustic (sound) generator 106 positioned within the cover. All acoustic generators and controllers discussed herein can comprise any commercially available generator/controller capable of producing and transmitting or broadcasting ultrasonic and/or sonic vibrations (available from, for example, Sonaer Ultrasonics, Farmingdale, N.Y., USA, and Hielscher Ultrasonics GMPH, Teltow, Germany).

The external cover 104 comprises any form of container capable of housing and protecting a sonic or acoustic generator 106. For example, the external cover 104 can comprise a sealed, liquid-tight, and gas-tight material (e.g., metal, alloys, plastic, glass, rubber, etc., or any combination of such materials) that includes either a wired or wireless connection 108 for receiving power and control signals. The external cover can be formed of any appropriate material that will be durable in the environment in which the sonic source will be located. In each of the examples herein, the sonic source is positioned within the cover 104 and the cover 104 is adapted to be positioned within an opening of an item and generate and transmit sound waves into the percolation paths of the item. The opening in the item (e.g., borehole oil well hole in the ground) can be fully or partially lined with a casing, or can be unlined. In regions in which the borehole penetrates largely impermeable rock a casing within the borehole may not be used. Sonic generators can be in contact either with the casing, or with a rock formation in an uncased region.

Figure 2:
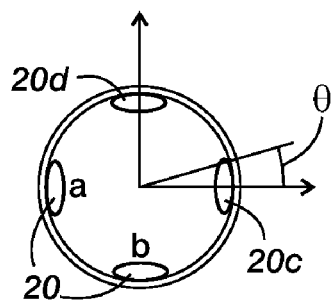
FIG. 2 is a schematic top-view diagram illustrating multiple sonic sources within a borehole or casing.

Note that the remaining illustrations do not specifically show the electrical and mechanical connections 108 to provide clarity in the drawings, although one ordinarily skilled in the art would understand that such devices could be included on all structures herein. FIG. 2 illustrates another type of sonic source that can be used herein. The sonic source shown in FIG. 2 includes multiple sound generators 20 (labeled a-d) and is otherwise similar to the embodiment shown in FIG. 1. The multiple sound generators 20 can be included within a single cover or can each be individual units, each having its own cover. Thus, FIG. 2 illustrates a single device having four sound generators a-d, or alternatively illustrates four devices a-d within a borehole opening, each having its own sound generator.

Figure 3:
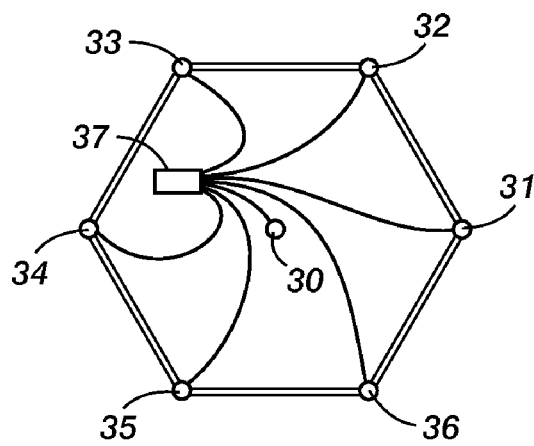
FIG. 3 is a schematic top-view diagram illustrating multiple boreholes or casings, each containing at least one sonic source.

FIG. 3 illustrates another embodiment herein that includes multiple sonic or ultrasonic sources 30-36 each positioned within a different borehole opening. FIG. 3 comprises a top-view illustration looking down from the top surface of an item in which boreholes located at positions 30-36 have been formed and into which the sonic sources 30-36 have been located. As shown in FIG. 3, a controller 37 is connected either by wires as shown (or wirelessly) to each of the sonic sources 30-36. Note that the controller 37 is shown in FIG. 3 as being positioned within the periphery of sonic sources 30-36; however, as would be understood by those ordinarily skilled in the art, the controller 37 can be positioned at any location and can be quite remote from the location of the sonic sources 30-36. Further, the controller 37 and the wired connections are only shown in FIG. 3 to maintain clarity in the other illustrations; however, one ordinarily skilled in the art would understand that the controller and some form of connections could be included in each of the embodiments herein. Each of the sonic sources 30-36 shown in FIG. 3 comprises either a single sound generator 106 or multiple sound generators 20 as discussed above with respect to FIGS. 1 and 2.

Figure 4:
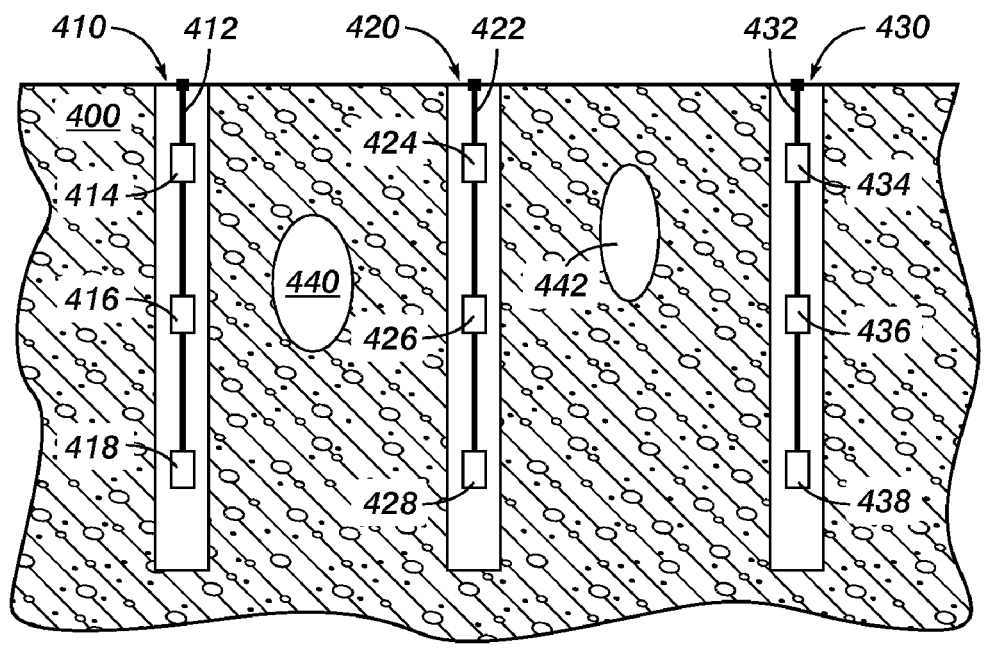
FIG. 4 is a schematic side-view diagram of multiple boreholes, each containing multiple sonic sources at different depths within the boreholes.

FIG. 4 illustrates side (or cross-sectional) views of an item (e.g., the ground) 400 into which borehole openings 410, 420, 430 have been formed. The "percolation path" is a path within the item which is made up of solid particles and liquid particles (oil) that need to be separated from one another. Thus, for example the item 400 can comprise ground under which trapped oil reserves are located within the dirt/rock. In these examples, the percolation paths comprise the paths of the item where the trapped oil is located, the dirt is located. Again, the active percolation paths are areas of the reservoir from which oil and gas is currently being extracted, and the embodiments herein can control the locations of the second sound to reposition or move these percolation paths into areas of the reservoir which have not yet been tapped or produced.

Further, FIG. 4 illustrates multiple sonic sources 414-416-418; 424-426-428; and 434-436-438 positioned within their respective borehole openings 410, 420, and 430. The percolation path is between the different borehole openings 410, 420, 430. The structure includes at least one support structure 412, 422, 432 (cable, wire, pipe, frame, etc.) connected to the external cover of the sonic sources. The support structure is adapted to maintain at least one of the sonic sources at a fixed position (e.g., depth) with the borehole opening.

While all borehole openings are shown as having multiple sonic sources, different embodiments could use single sonic sources in some borehole openings with different numbers of sonic sources in other borehole openings. Further, other embodiments can comprise a single borehole opening having multiple sonic sources at different depths.

By having different sonic sources at different locations and different depths, the locations and depths of positions of the second sound (cause by sound wave interference, cancellation, and combination) can be precisely controlled. Thus, with the embodiment shown in FIG. 4, the specific location 440, 442 where the second sound is produced can be moved from location to location within the item to specifically (and methodically) separate liquid from the surrounding solid to allow the liquid to be removed in the most efficient manner. As taught by Meyer (U.S. Pat. No. 6,405,796) using a single sonic source, the location of the second sound was uncontrolled.

Figure 5:
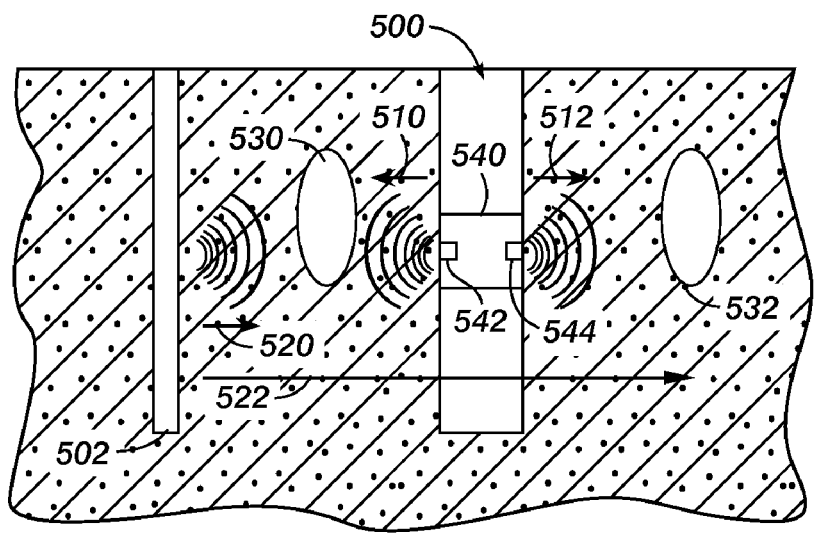
FIG. 5 is a schematic side-view diagram of multiple sonic sources within a borehole or casing and a reflective feature.

FIG. 5 illustrates another embodiment that can use a single borehole opening 500 and a single sonic source 540 to control the location of the second sound. The feature that allows this embodiment to control the location of the second sound is the existence of a natural or artificial reflective structure 502, such as a high acoustic impedance geological formation (e.g., a salt layer, a volcanic chimney or dike, or a neighboring borehole).

In one example of this embodiment, the sonic source 540 can include only a single acoustic generator 542 positioned to direct sonic waves toward the reflective structure 502. The sonic waves 510 generated by the acoustic generator 542 that are reflected back by the reflective structure are shown as reflected waves 520 and 522 in FIG. 5. The location 530 where the sonic waves 510 generated by the sole acoustic generator 542 interfere (cancel or add) with the sonic waves 520 being reflected back from the reflective structure is shown as percolation path 530. The second sound can be moved to different locations within the percolation path 530 by controlling the phases and timings of the sound waves generated by the sound generator 542 to cause the primary soundwaves 510 to interfere with the reflected soundwaves 520 at a specific location within the percolation path 530.

In another example of this embodiment, the sonic source 540 can include two acoustic generators 542, 544, one of which is positioned to direct sonic waves toward the reflective structure 502. The locations 530, 532 where the sonic waves 510 generated by the sole acoustic generator 542 interfere (cancel or add) with the sonic waves 520, 522 being reflected back from the reflective structure is shown as percolation paths 530, 532. The second sound can be moved to different locations within the percolation paths 530, 532 by controlling the phases and timings of the sound waves generated by the sound generators 542, 544 to cause the primary soundwaves 510 to interfere with the reflected soundwaves 520, 522 at specific locations within the percolation paths 530, 532.

Figure 6:
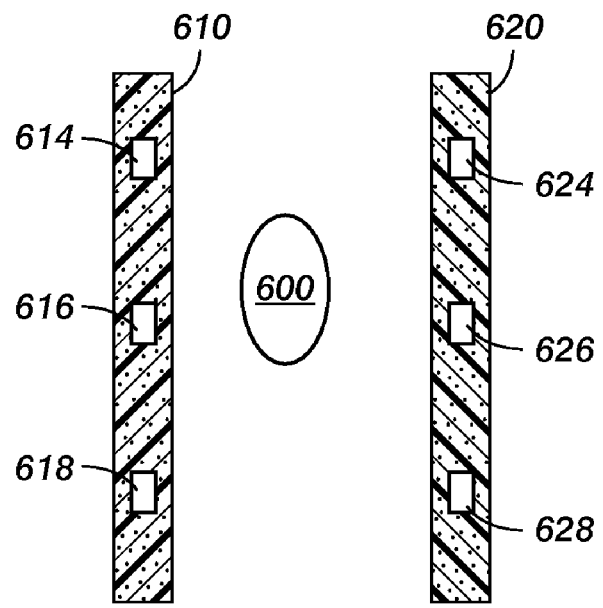
FIG. 6 is a schematic side-view diagram illustrating multiple sonic sources around an item.

FIG. 6 illustrates an embodiment that does not use openings within an item 600 but instead places sonic sources 610, 620 (which can have one or more sound generators 614-618 and 624-628) on different sides of the item 600. This embodiment is useful, for example, when separating solid particles from liquid particles within a smaller item (e.g., breaking up oil particles within individual rocks). While two sonic sources 610, 620 are illustrated in FIG. 6, one ordinarily skilled in the art would understand that more sonic sources could be utilized to more completely surround the item 600. Similarly, a single sonic source could be utilized with a reflective surface in this embodiment similar to the situation shown with respect to FIG. 5.

Even though not shown in all examples herein, the controller 37 is included in all embodiments herein and regulates the frequency of the sound waves to cause the liquid particles oscillate out of phase with the solid particles. Further, the controller 37 is adapted to regulate the phases and amplitudes of the sound waves generated by the different sonic sources so as to control locations within the percolation path where the liquid particles oscillate out of phase with the solid particle and to control amounts by which the liquid particles oscillate out of phase with the solid particles.

Figure 7:
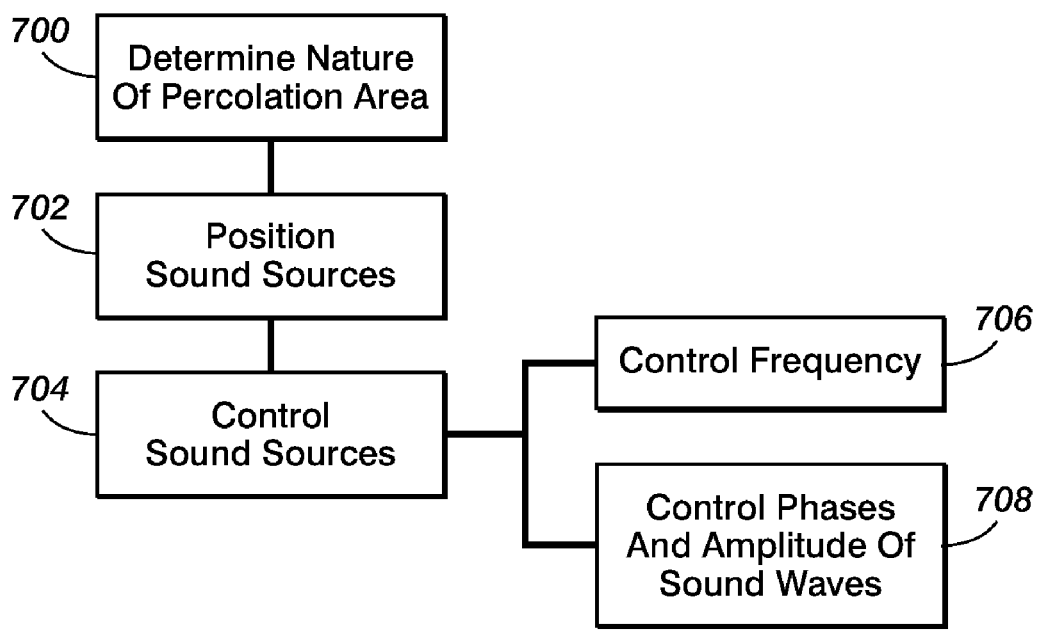
FIG. 7 is a flow diagram illustrating embodiments herein.

The processing performed by embodiments herein is generally shown in flowchart form in FIG. 7. The process flow begins with item 700 by determining the nature of the percolation path. This can include measuring the transmission of test sound waves through the item to locate percolation paths and reflective features using, for example, the system described in U.S. Patent Publications 2007/0069732, 2006/0036376, 2005/0201203, and for 2003/0164038 (incorporated herein by reference) or any other similar system. In item 702, the sonic sources are positioned around the percolation path (using existing openings or by forming new openings). In item 702, different embodiments herein can position the sonic sources within the openings so as to form a regular pattern of the sonic sources within the item. Embodiments herein can also maintain the sonic sources at a fixed positions (e.g., fixed depths) with the item.

In item 704, the method controls the plurality of sonic sources to generate sound waves within at least one opening of an item. Thus, in item 706, the method regulates the frequency of the sound waves such that the liquid particles oscillate out of phase with the solid particles. In item 708, the method also regulates the phases and amplitudes of the sound waves generated by the different sonic sources so as to control locations (in three dimensions) within the percolation path where the liquid particles oscillate out of phase with the solid particles.

More specifically, in item 708, the regulating of the phases of the sound waves causes the sound waves to combine is specific locations of the percolation path and causes the sound waves to cancel each other out in other locations of the percolation path. Thus, embodiments herein can regulate the phases of the sound waves and the amplitude of the sound waves generated by different ones of the sonic sources so as to control locations within the percolation path where the liquid particles oscillate out of phase with the solid particles and to control amounts by which the liquid particles oscillate out of phase with the solid particles.

Continuing with the example of oil extraction from an oil reservoir, in order to model how the acoustic fields from several different sites might add, the embodiments herein consider how the field from a single site might look. The acoustic pressure amplitude in the rock around the borehole can be expressed as an expansion of a product of terms that depend on radius from the center of the borehole times a complete set of angular terms. For example, in one embodiment the pressure amplitude can be expressed as:

$$\text{Amp} = f(R) e^{i\omega t} \Sigma P_n(\cos(\theta)), \quad [1]$$

where $P_n(\theta)$ are the Legendre polynomials: $P_0(\cos(\theta))=1$, $P_1(\cos(\theta))=\cos(\theta)$, $P_2(\cos(\theta))=(\frac{1}{2})(3\cos^2(\theta)-1)$, etc. For the sonic source layout shown in FIG. 2, the operator has direct control of the form of the angular field produced. If all of the ultrasonic sources in FIG. 2 sound generators a, b, c, d are driven in phase the ultrasonic output is largely independent of $\theta$, leading to a large $P_o$ term. If sources b and d are not driven, and source a is out of phase with source c a big P1 term, or an amplitude going as $\cos(\theta)$ is expected. If sources a and c are not driven, but source b is driven out of phase with source d, then an amplitude going as $\sin(\theta)$ (not a Legendre polynomial) is expected. If sources a and c were driven in phase, and b and d were not driven, then a big $P_2$ term is expected.

In order to make use of multiple ultrasonic sources distributed aerially around an oil reservoir to control the location of ultrasonically enhanced oil recovery, it is useful to have control of the angular dependence of the acoustic wave intensity as discussed above. For the purposes of our discussion here it is assumed that the $P_o$ (a monopole term, independent of angle), the $\cos(\theta)$, and the $\sin(\theta)$ amplitudes (dipole terms) can be controlled. Finer position dependent control can be obtained using $P_2(\cos(\theta))$ amplitude control, etc.

Since the embodiments herein are interested in the interference of acoustic waves they control the phases as well as the amplitudes of all of the active ultrasonic transducers that are active simultaneously. This is true not only of the ultrasonic sources within one borehole, but of all of the boreholes simultaneously. This can be done either by use of hardwired connections among the grid of boreholes, or through wireless control. The phase differences between wells can result in the spatial shift of areas of maximum pressure field at specific locations (in three dimensions).

Figure 8:
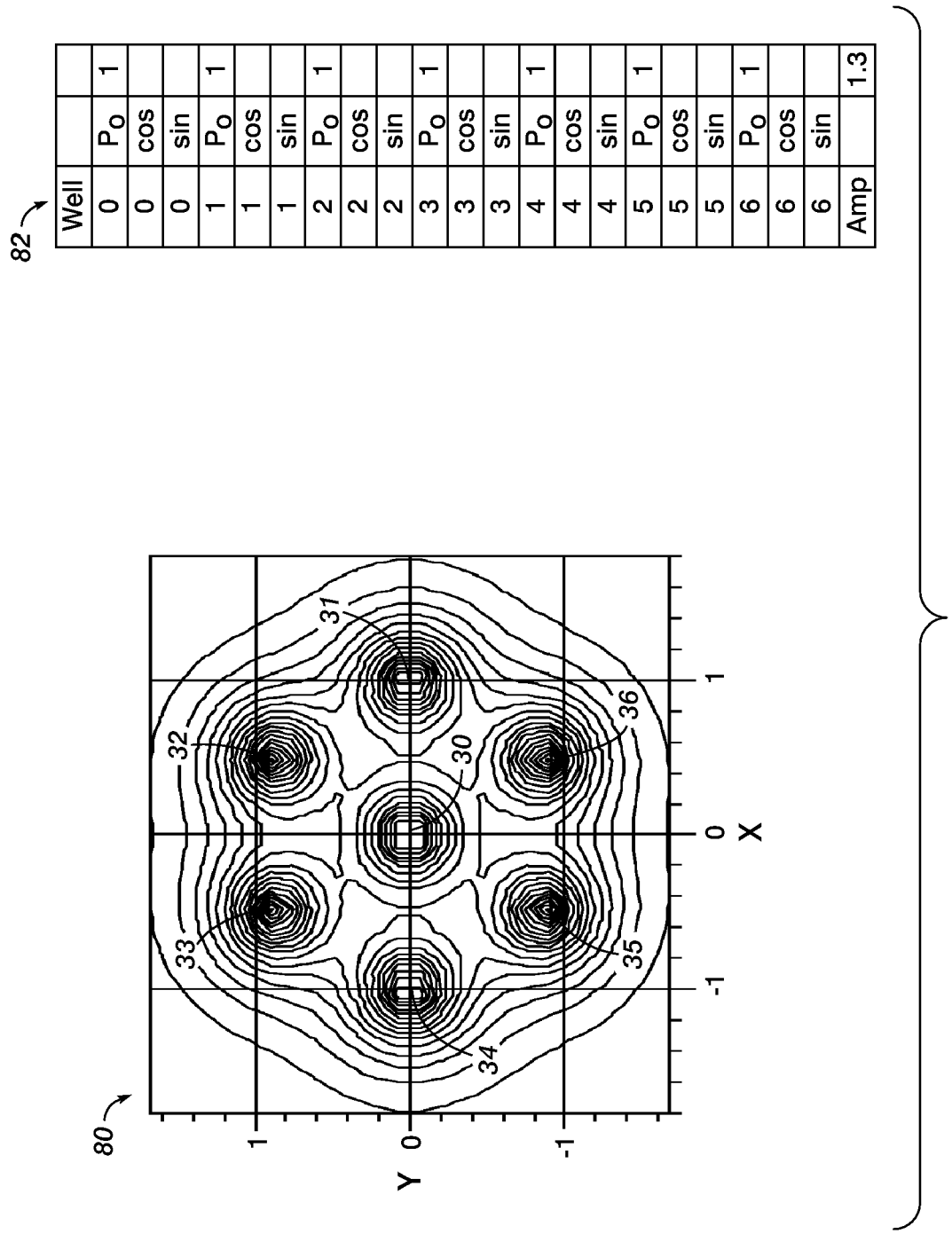
FIGS. 8-15 are charts and tables showing performance achieved by embodiments herein.

The embodiments herein concentrate sonic or ultrasonic energy in any portion of the oil reservoir by varying the angular dependence of the sonic sources at each of the seven (numbered 30-36) sonic sources shown in FIG. 3. The area immediately around any sonic source is best sonified by generation of a $P_o$ (cylindrically-symmetric) wave at that sonic source site. This is illustrated in FIG. 8. This figure was generated using a specific model solution of the form indicated in Eq. [1].

Figure 9:
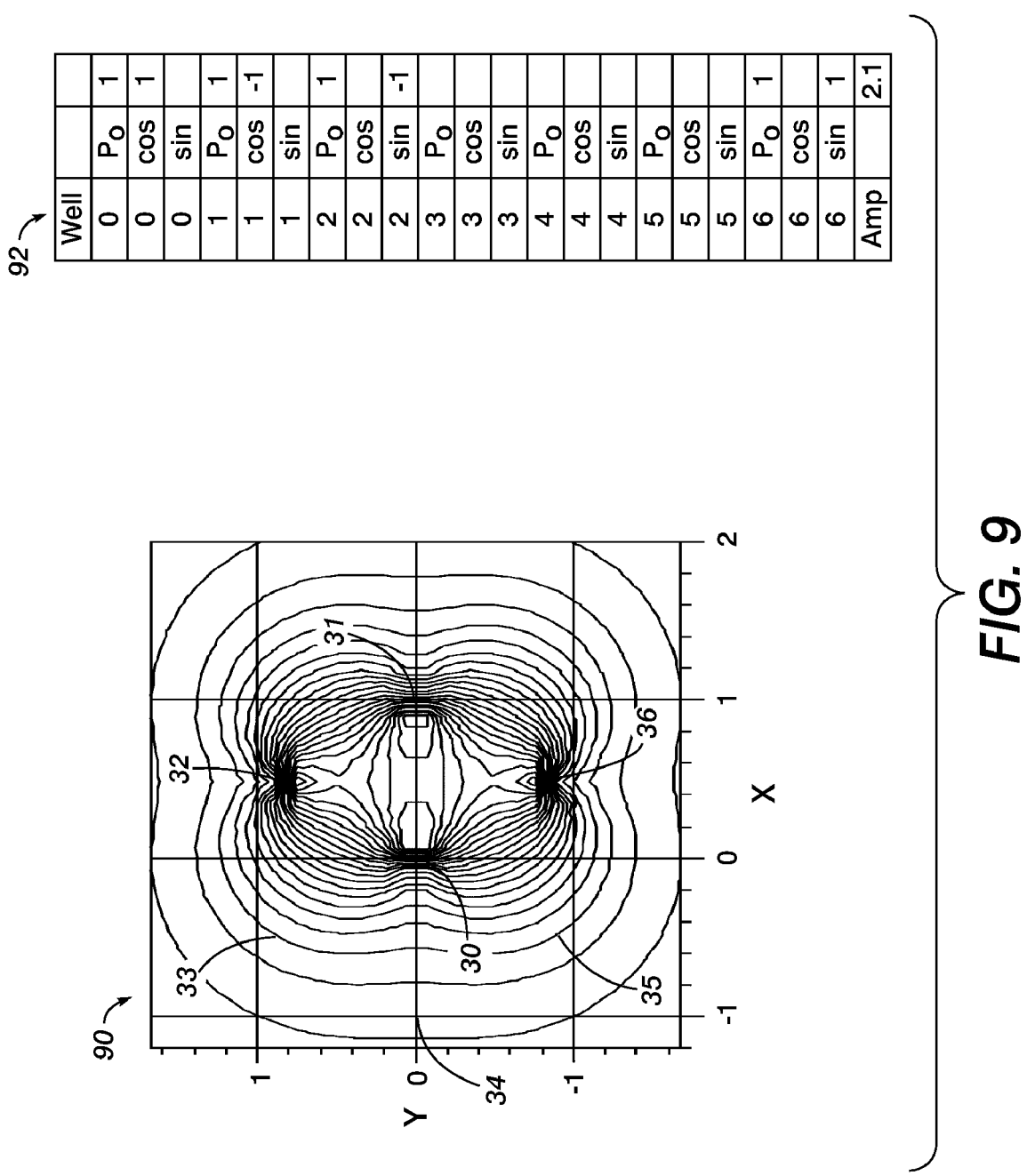

Note that the locations of the sonic sources 30-36 are shown overlaid on the graphs of FIGS. 8 and 9 only. The locations of the sonic sources 30-36 are easily determined within the graphic areas of the Figures by locating the central sonic source 30 at the X, Y origin (0, 0). FIGS. 10-15 do not include such overlay for clarity purposes; however the positions of the various sonic sources 30-36 can be easily determined through reference to the X, Y origin in each of FIGS. 10-15. Note also that each of FIGS. 8-15 includes a graphic region 80, 90, 100, 110, 120, 130, 140, 150 and a table region, 82, 92, 102, 112, 122, 132, 142, 152 which summarizes the settings for each graphic region. More specifically, the tables show the amplitude and angular direction for each sonic source (well) that create the pattern of sound waves shown in the corresponding graph.

As shown in FIG. 9, the area between sonic sources 30 and 31 will receive the highest sonification (the second sound will be concentrated in the area between sonic sources 30 and 31) when sonic source 30 transducers are adjusted to produce a $P_o+\cos(\theta)$ wave, sonic source 1 produce a $P_o-\cos(\theta)$ wave, sonic source 2 produce a $P_o-\sin(\theta)$ wave, and sonic source 6 produces a $P_o+\sin(\theta)$ wave. This is summarized in the table 92.

Figure 10:
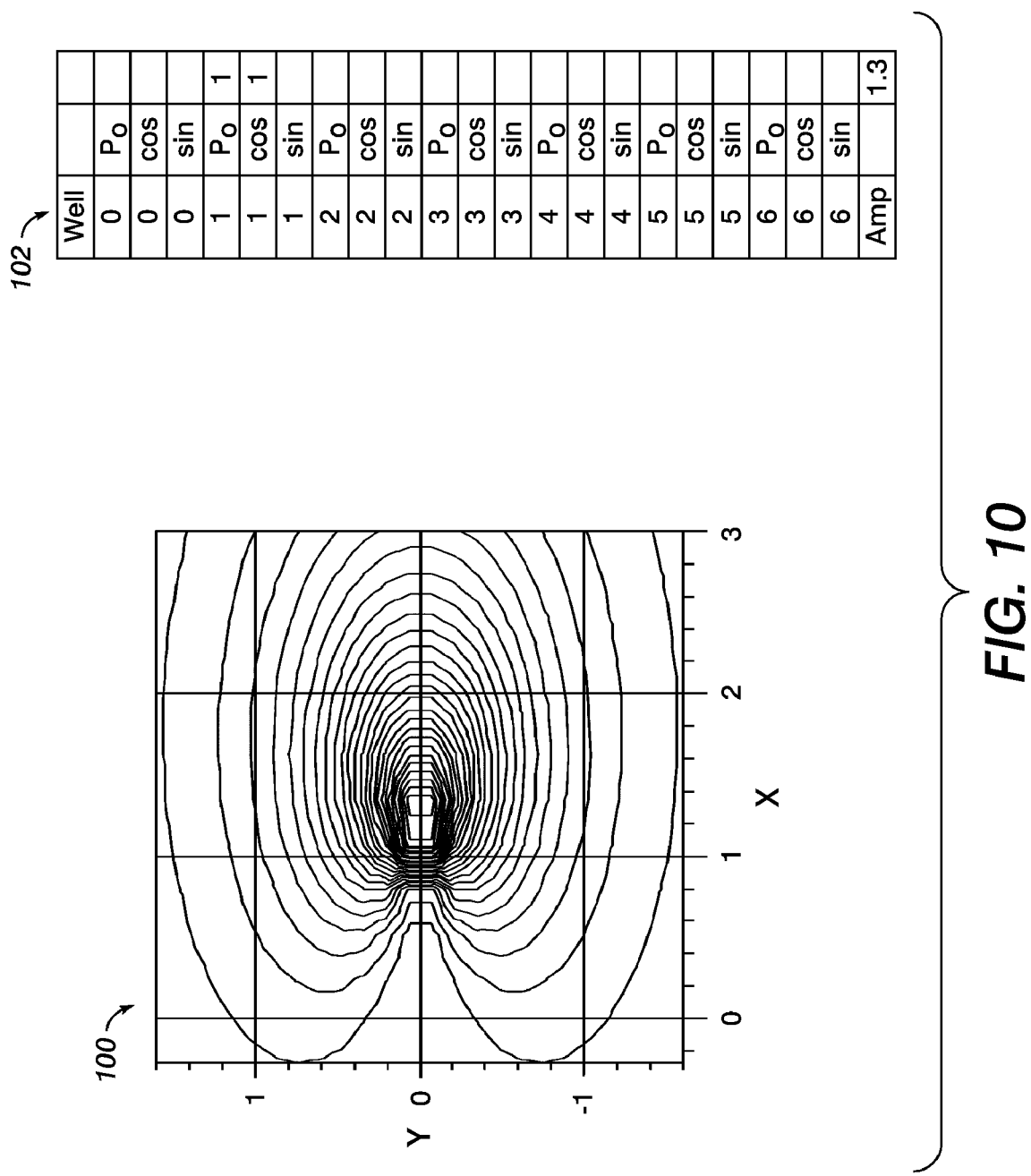
Figure 11:
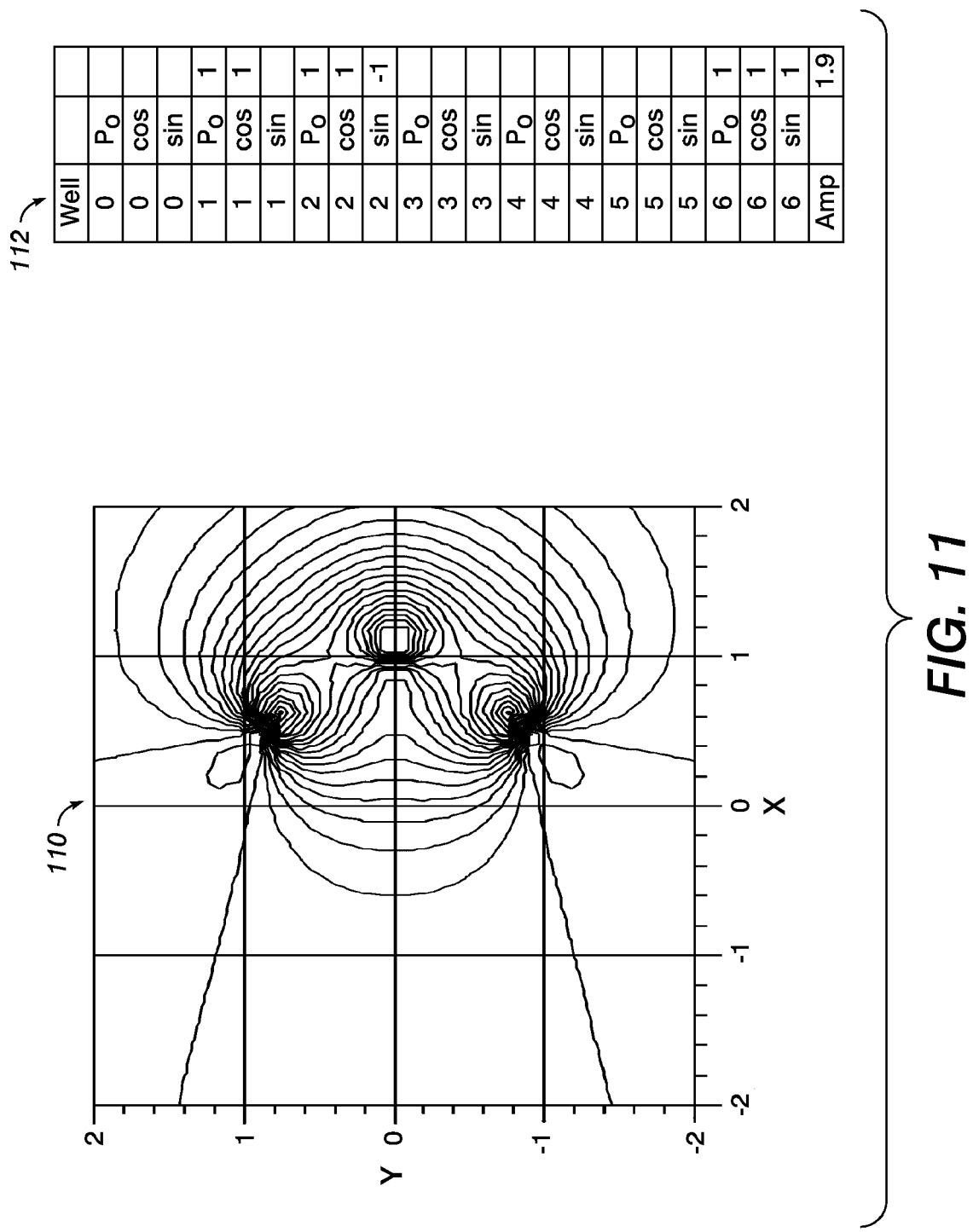

As shown in FIG. 10, the area outside sonic source 31 will receive the highest sonification (the second sound will be concentrated in the area outside sonic source 31) in one of two ways. First, if it is desired to localize sonification to the region of sonic source 31 then this can be accomplished according to the settings shown in table 102. Alternatively, even higher acoustic amplitudes can be achieved in this region by making use of the transducers on sonic sources 32 and 36, as shown in chart 110 and the settings shown in table 112 in FIG. 11.

The difference in these approaches (settings in table 102 vs. settings in table 112) may not be apparent immediately, other than that the second approach produces higher sonic amplitudes. However, by use of these techniques the production of oil from mature reservoirs becomes not an exercise in random percolation theory as it is currently, but rather an optimization problem in oil traffic control. The order in which various parts of the reservoir are drained may influence the maximum amount of oil recovered over the course of the reservoir productive life. The two approaches discussed above may give similar amounts of oil extracted from the area to the right of sonic source 31, but they will also differ in the amounts of oil extracted near sonic sources 32 and 36. It may or may not be advantageous to extract oil from regions near sonic source 32 and 36 at the same time as from beyond sonic source 31.

Figure 12:
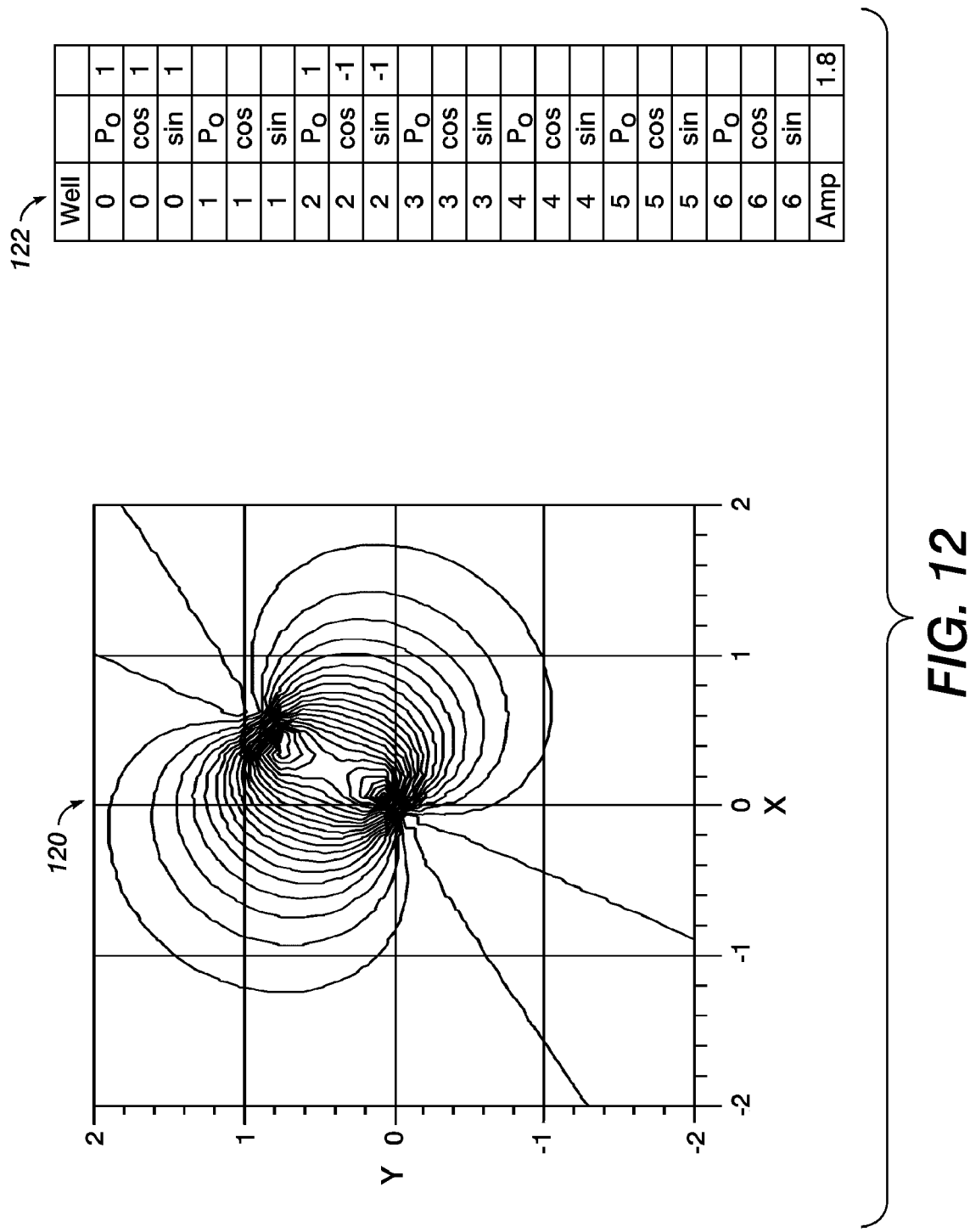
Figure 13:
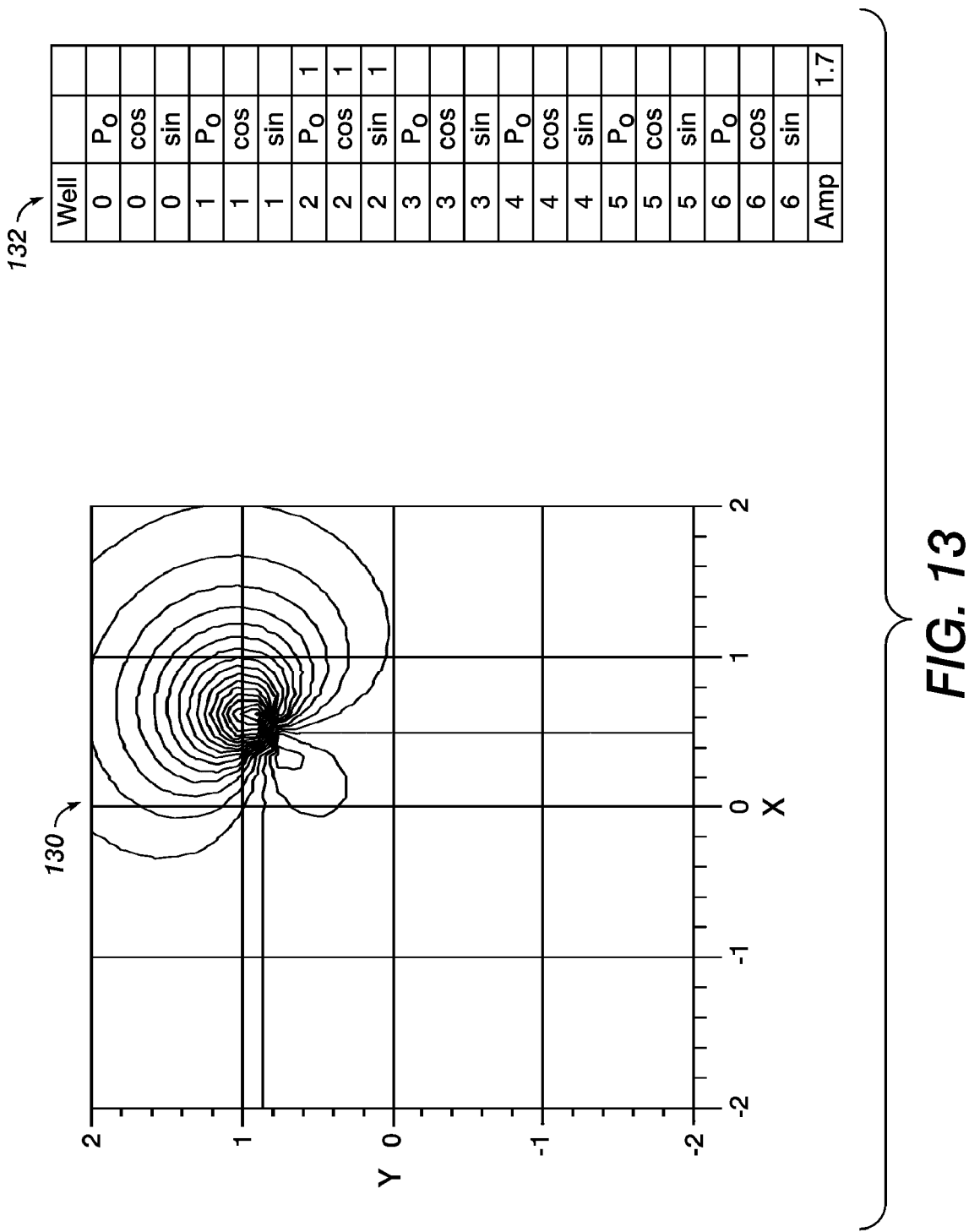
Figure 14:
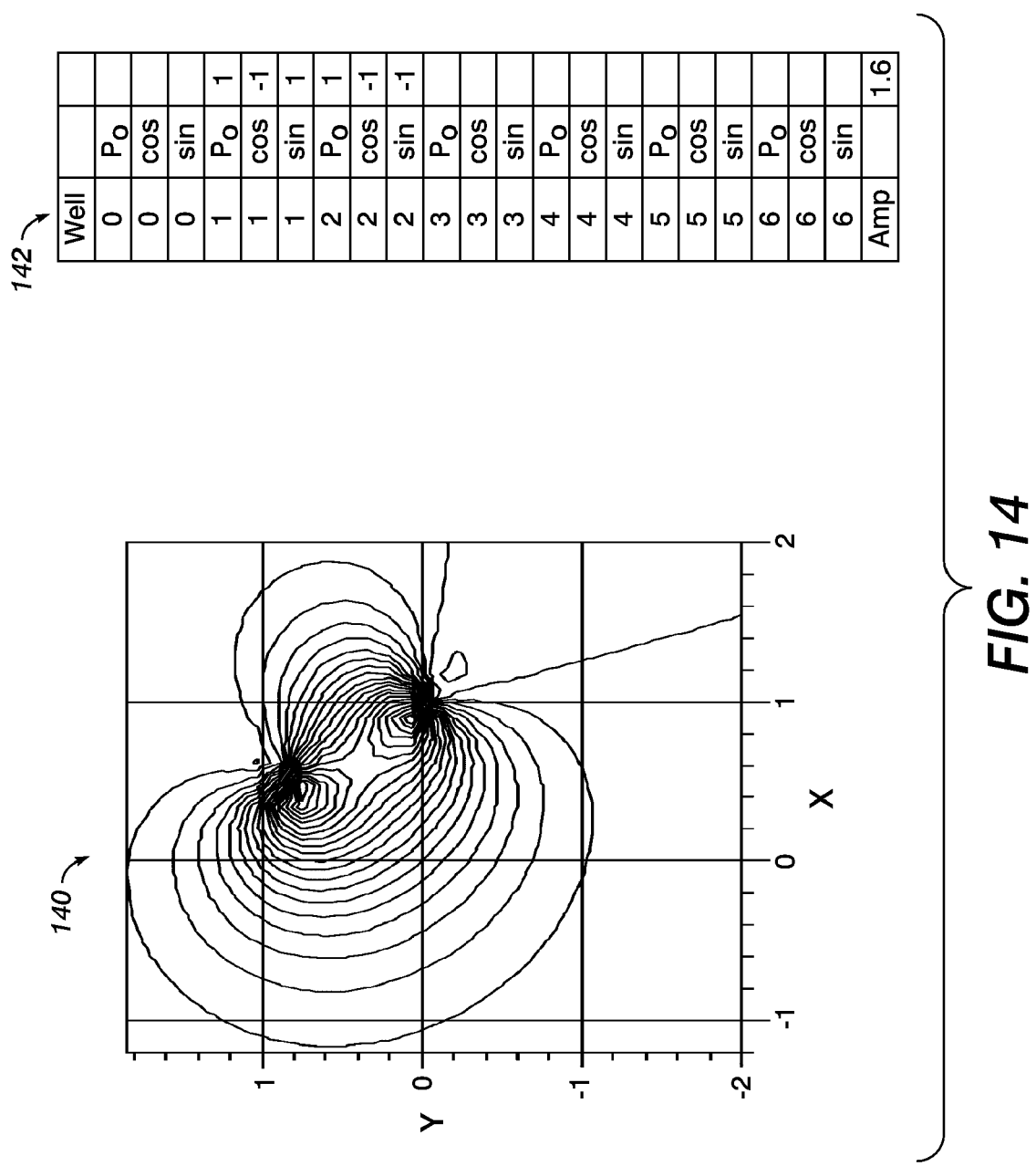
Figure 15:
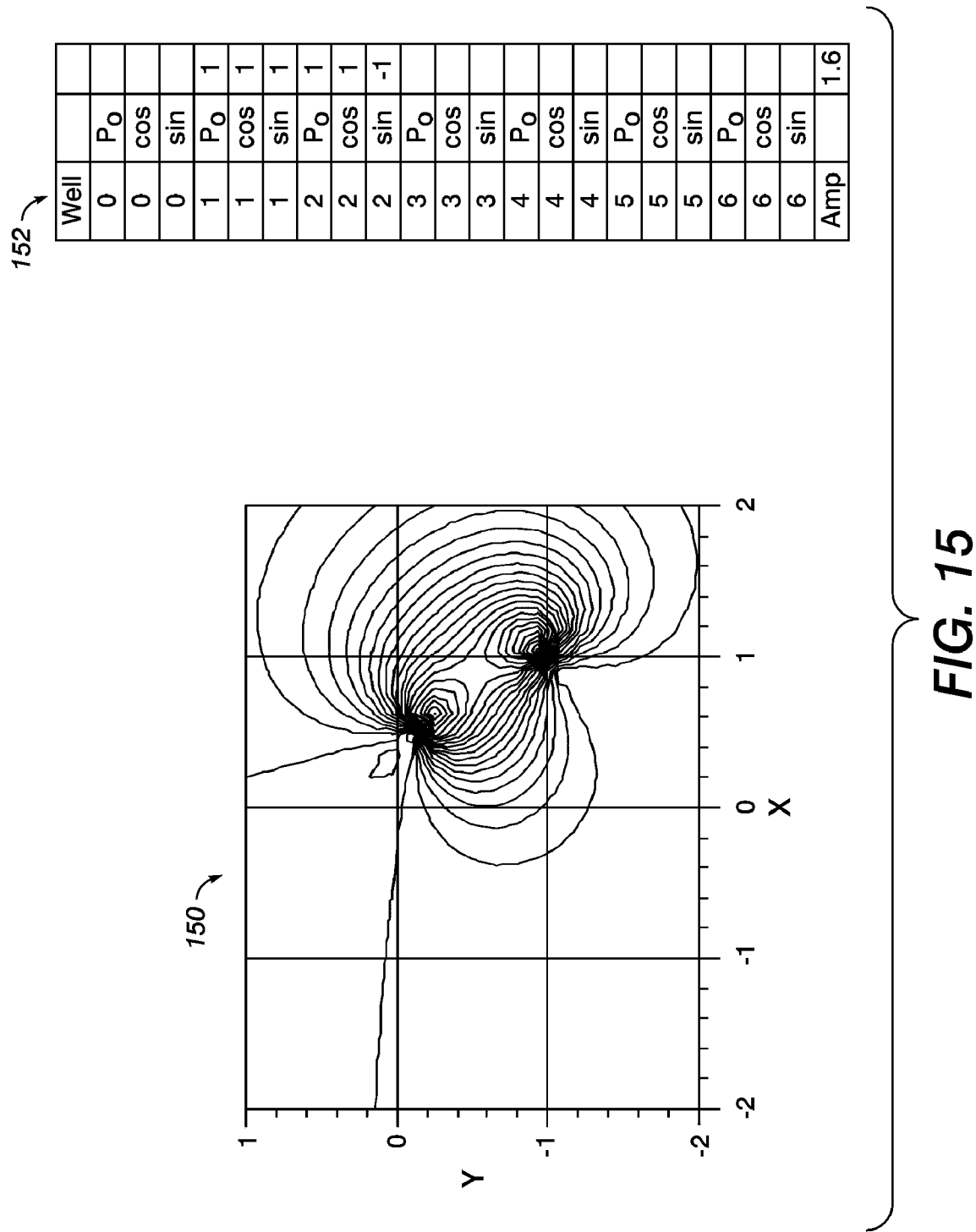

As shown in FIG. 12, the concentration of second sound effects (areas where solid particles oscillate differently than liquid particles) can be controlled to exist only between sonic sources 30 and 32 by using the settings shown in table 122, as illustrated by the graph 120. Similarly, as shown in FIG. 13, the concentration of second sound effects (areas where solid particles oscillate differently than liquid particles) can be controlled to exist only outside sonic source 32 by using the settings shown in table 132, as illustrated by the graph 130. As shown in FIG. 14, the concentration of second sound effects (areas where solid particles oscillate differently than liquid particles) can be controlled to exist only between sonic sources 31 and 32 by using the settings shown in table 142, as illustrated by the graph 140. As shown in FIG. 15, the concentration of second sound effects (areas where solid particles oscillate differently than liquid particles) can be controlled to exist only outside sources 31 and 32 by using the settings shown in table 152, as illustrated by the graph 150.

While this oilfield example and FIG. 3 are six fold symmetrical, one ordinarily skilled in the art would understand that any number of wells having sonic sources, spaced in any manner could be used with embodiments herein. High concentrations of sonic energy can be obtained in all other areas of the field by simple generalizations of the choices illustrated above.

With embodiments herein, a simulation of various extraction scenarios can be run to determine the optimum approach to draining any specific reservoir. In effect this may give a complicated three-dimensional Konigsberg Bridge problem. (Euler's Konigsberg Bridge problem was how to visit all of the islands in the city of Konigsberg, only crossing each bridge once). The analog here is how to extract the maximum amount of oil from any reservoir by steering the active percolation front through each region only once. This is notable because it may not be possible to return the active percolation front to a region after it has left it. Thus, by being able to control the order of extraction from different areas, the present embodiments present advantages over existing systems.

The localization of acoustic energy to specific areas of the oil reservoir has been illustrated by the examples provided. A higher detail of localization can be provided by the use of more ultrasonic sources in each borehole, because with more sources higher order angular dependences, such as $P_2(\cos(\theta))$ (acoustic quadrupole), $P_3(\cos(\theta))$ (acoustic octupole),), $P_3(\cos(\theta))$ (hexadecapole), etc. can be generated. The more multipoles in the expansion of the acoustic field at each borehole, the more refined can be the localization of acoustic energy.

In summary, through the use of multiple ultrasonic sources scattered around an oil reservoir the embodiments herein systematically apply ultrasonic energy to localized areas of any item having an area of solid and liquid particles. It is possible to sonify areas not only centered around the individual ultrasonic source sites, but also between source sites, and outside the perimeter of those source sites. This technique, together with the teachings on the relationship between local lithology, fluid permeability, and the optimal second sound ultrasonic frequency provided by patent (U.S. Pat. No. 6,405,796) make possible the systematic production from all parts of an item, such as oil reservoir.

Thus, the embodiments herein provide a comprehensive system for maximizing oil recovery from an oil reservoir. The details of implementation in any individual reservoir will depend on the details of the local lithography (i.e., rock types) and stratigraphy (i.e., structure of the rock layers), and perhaps even the details of the local quality of the bore hole (e.g., wall roughness) and/or piping as determined from local well logs.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
controlling at least one sonic source to generate sound waves relative to an item, wherein said item comprises at least one percolation path that comprises a combination of liquid particles and solid particles, wherein said controlling transmits said sound waves to said percolation path;
regulating frequency of said sound waves such that said liquid particles oscillate out of phase with said solid particles; and
regulating phases of said sound waves generated by said sonic source so as to control locations within said percolation path where said liquid particles oscillate out of phase with said solid particles to close an active percolation path and open a non-active percolation path to obtain said liquid particles from said non-active percolation path.

2. The method according to claim 1, further comprising positioning said at least one sonic source within at least one opening of said item so as to form a regular pattern of said sonic sources within said item.

3. The method according to claim 1, further comprising maintaining said sonic source at least one fixed position with said item.

4. The method according to claim 1, wherein said regulating of said phases of said sound waves causes said sound waves to combine at specific locations of said percolation path and cause said sound waves to cancel each other out at other locations of said percolation path.

5. The method according to claim 1, wherein said item comprises one of the ground, aggregates, porous structures, porous materials, and a semi-solid structure.

6. A method comprising:
controlling a plurality of sonic sources to generate sound waves within at least one opening of an item, wherein said item comprises at least one percolation path that comprises a combination of liquid particles and solid particles, wherein said controlling transmits said sound waves to said percolation path;
regulating frequency of said sound waves such that said liquid particles oscillate out of phase with said solid particles; and
regulating phases of said sound waves and amplitude of said sound waves generated by different ones of said sonic sources so as to control locations within said percolation path where said liquid particles oscillate out of phase with said solid particles to close an active percolation path and open a non-active percolation path to obtain said liquid particles from said non-active percolation path in a systematic process that optimizes traffic control of liquid particles within said item to maximize recovery of said liquid particles from said item.

7. The method according to claim 6, further comprising positioning said sonic sources within said openings so as to form a regular pattern of said sonic sources within said item.

8. The method according to claim 6, further comprising maintaining said sonic sources at a fixed positions with said item.

9. The method according to claim 6, wherein said regulating of said phases of said sound waves causes said sound waves to combine at specific locations of said percolation path and cause said sound waves to cancel each other out at other locations of said percolation path.

10. The method according to claim 6, wherein said item comprises one of the ground, aggregates, porous structures, porous materials, and a semi-solid structure.

11. An apparatus comprising:
a controller; and
a plurality of sonic sources connected to said controller,
wherein each of said sonic sources comprises:
an external cover positioned relative to an item, wherein said item comprises at least one percolation path that comprises a combination of liquid particles and solid particles; and
at least one sonic generator positioned within said external cover to generate and transmit sound waves into said percolation paths,
wherein said controller regulates frequency of said sound waves such that said liquid particles oscillate out of phase with said solid particles, and
wherein said controller regulates phases of said sound waves generated by different ones of said sonic sources so as to control locations within said percolation path where said liquid particles oscillate out of phase with said solid particles to close an active percolation path and open a non-active percolation path to obtain said liquid particles from said non-active percolation path.

12. The apparatus according to claim 11, wherein each of said sonic sources comprises a plurality of sonic generators positioned within said external cover.

13. The apparatus according to claim 11, wherein said external cover comprises a sealed, liquid-tight, and gas-tight material.

14. The apparatus according to claim 11, further comprising at least one support structure connected to said external cover, wherein said support structure maintains at least one of said sonic sources at a fixed position with said item.

15. The apparatus according to claim 11, wherein said item comprises one of the ground, aggregates, porous structures, porous materials, and a semi-solid structure.

16. An apparatus comprising:
a controller; and
a plurality of sonic sources connected to said controller,
wherein each of said sonic sources comprises:
an external cover positioned within an opening of an item, wherein said item comprises at least one percolation path that comprises a combination of liquid particles and solid particles; and
at least one sonic generator positioned within said external cover to generate and transmit sound waves into said percolation paths,
wherein said controller regulates the frequency of said sound waves such that said liquid particles oscillate out of phase with said solid particles, and
wherein said controller regulates phases of said sound waves and amplitude of said sound waves generated by different ones of said sonic sources so as to control locations within said percolation path where said liquid particles oscillate out of phase with said solid particles to close an active percolation path and open a non-active percolation path to obtain said liquid particles from said non-active percolation path in a systematic process that optimizes traffic control of liquid particles within said item to maximize recovery of said liquid particles from said item.

17. The apparatus according to claim 16, wherein each of said sonic sources comprises a plurality of sonic generators positioned within said external cover.

18. The apparatus according to claim 16, wherein said external cover comprises a sealed, liquid-tight, and gas-tight material.

19. The apparatus according to claim 16, further comprising at least one support structure connected to said external cover, wherein said support structure maintains at least one of said sonic sources at a fixed position with said opening.

20. A program storage medium readable by a machine, embodying a program of instructions executable by the machine to perform method steps for enhanced oil recovery comprising:
controlling at least one sonic source to generate sound waves relative to an item, wherein said item comprises at least one percolation path that comprises a combination of liquid particles and solid particles, wherein said controlling transmits said sound waves to said percolation path;
regulating frequency of said sound waves such that said liquid particles oscillate out of phase with said solid particles; and
regulating phases of said sound waves generated by said sonic source so as to control locations within said percolation path where said liquid particles oscillate out of phase with said solid particles to close an active percolation path and open a non-active percolation path to obtain said liquid particles from said non-active percolation path.

* * * * *